(12) United States Patent
Imaizumi et al.

(10) Patent No.: US 7,824,746 B2
(45) Date of Patent: Nov. 2, 2010

(54) RADIATION CURABLE RESIN, LIQUID CRYSTAL SEALING MATERIAL, AND LIQUID CRYSTAL DISPLAY CELL USING SAME

(75) Inventors: Masahiro Imaizumi, Kita-ku (JP); Yasumasa Akatuka, Sanyoonoda (JP); Naoyuki Ochi, Saitama (JP); Eiichi Nishihara, Kita-ku (JP); Masaru Kudou, Saitama (JP); Toyohumi Asano, Saitama (JP); Naoki Toneda, Kita-ku (JP); Masahiro Hirano, Ageo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 787 days.

(21) Appl. No.: 11/665,111

(22) PCT Filed: Oct. 12, 2005

(86) PCT No.: PCT/JP2005/018780

§ 371 (c)(1),
(2), (4) Date: May 25, 2007

(87) PCT Pub. No.: WO2006/043454

PCT Pub. Date: Apr. 27, 2006

(65) Prior Publication Data

US 2008/0305707 A1    Dec. 11, 2008

(30) Foreign Application Priority Data

Oct. 20, 2004    (JP)    ............................. 2004-305590

(51) Int. Cl.
*G02F 1/1339* (2006.01)
*C08G 63/47* (2006.01)
*C08F 290/06* (2006.01)

(52) U.S. Cl. ...................... 428/1.5; 428/1.54; 428/1.55; 349/153; 349/190; 522/108; 524/558

(58) Field of Classification Search .................. 428/1.5, 428/1.54, 1.55; 522/108; 524/558; 349/153, 349/190
See application file for complete search history.

(56) References Cited

U.S. PATENT DOCUMENTS

| | | | |
|---|---|---|---|
| 4,144,283 A | 3/1979 | Matsubara | 525/48 |
| 4,177,122 A * | 12/1979 | Sato | 522/45 |
| 5,770,706 A | 6/1998 | Wu et al. | 523/429 |
| 7,101,596 B2 * | 9/2006 | Sakano et al. | 428/1.53 |
| 7,521,099 B2 * | 4/2009 | Ochi et al. | 428/1.5 |
| 7,521,100 B2 * | 4/2009 | Imaizumi et al. | 428/1.53 |
| 7,537,810 B2 * | 5/2009 | Hayashi et al. | 428/1.1 |
| 7,678,433 B2 * | 3/2010 | Ochi et al. | 428/1.5 |
| 2003/0147034 A1 | 8/2003 | Kojima | 349/153 |
| 2004/0263763 A1 | 12/2004 | Kojima | 349/153 |
| 2005/0231679 A1 | 10/2005 | Kojima | 349/153 |

FOREIGN PATENT DOCUMENTS

| | | |
|---|---|---|
| EP | 0 321 824 | 12/1988 |
| JP | 63105178 A * | 5/1988 |
| JP | 63-179323 | 7/1988 |
| JP | 5-295087 | 11/1993 |
| JP | 6-279566 | 10/1994 |
| JP | 7-330866 | 12/1995 |
| JP | 9-318953 | 12/1997 |
| JP | 10-239694 | 9/1998 |
| JP | 2001-133794 | 5/2001 |
| JP | 2003-342351 | 12/2003 |
| JP | 2004-37937 | 2/2004 |
| JP | 2004-61925 | 2/2004 |
| JP | 2004-233858 | 8/2004 |
| JP | 2004-244515 | 9/2004 |
| WO | 2004/041900 | 5/2004 |

OTHER PUBLICATIONS

Derwent English abstract for JP 63-105178, 1988.*
European communication dated Feb. 3, 2009.

* cited by examiner

*Primary Examiner*—Shean C Wu
(74) *Attorney, Agent, or Firm*—Nields, Lemack & Frame, LLC

(57) ABSTRACT

A liquid crystal sealing material comprising (a) a radiation curable resin represented by the general formula (1) below, (b) a photopolymerization initiator and (c) a filler having an average particle diameter of not more than 3 μm.

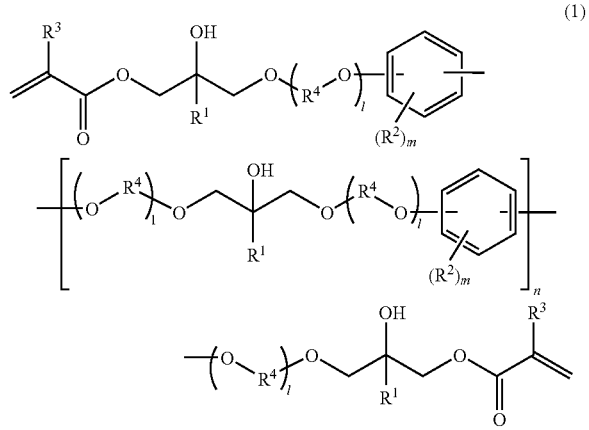

(In the formula (1), $R^1$ represents a hydrogen atom or a methyl group; $R^2$ may be the same or different and represents a hydrogen atom, a halogen atom, a hydroxyl group, a monovalent linear, branched or cyclic alkyl group having 1-10 carbon atoms or an alkoxy group having 1-10 carbon atoms; m represents an integer of 1-4; $R^3$ represents a hydrogen atom or a methyl group; $R^4$ represents a linear, branched or cyclic alkyl group having 1-10 carbon atoms; l represents a range of positive numbers from 1 to 5; and the repeating unit number n represents a range of positive numbers from 0 to 20.)

18 Claims, No Drawings

US 7,824,746 B2

RADIATION CURABLE RESIN, LIQUID CRYSTAL SEALING MATERIAL, AND LIQUID CRYSTAL DISPLAY CELL USING SAME

This application is a 371 of PCT/JP05/18780 filed Oct. 18, 2005.

TECHNICAL FIELD

The present invention relates to a radiation curable resin, a liquid crystal sealing material and a liquid crystal display cell using the same. More particularly, the present invention relates to a liquid crystal sealing material which can be used for manufacturing a liquid crystal display cell in which a liquid crystal is sealed by dropping the liquid crystal inside the wall of a liquid crystal sealing material formed on one substrate, thereafter laminating the other substrate thereon and curing the liquid crystal sealing material, and to a liquid crystal display cell manufactured using the liquid crystal sealing material.

BACKGROUND ART

As a manufacturing method of liquid crystal display cells, the so-called liquid crystal dropping process, which has a high mass productivity, is proposed accompanying the recent years' upsizing of liquid crystal display cells (see Patent Document 1 and Patent Document 2). Specifically, the manufacturing method involves dropping a liquid crystal inside a liquid crystal sealing material formed on one substrate, and thereafter laminating the other substrate thereon to seal the liquid crystal.

However, the liquid crystal dropping process, since a liquid crystal sealing material in an uncured state first contacts with a liquid crystal, has such a problem that components of the liquid crystal sealing material dissolve in the liquid crystal on contacting and the specific resistance value of the liquid crystal decreases, and as a result, such mass production method of the liquid crystal cell does not fully spread widely.

As curing methods of a liquid crystal sealing material after laminating in the liquid crystal dropping process, there are three methods of heat-curing, photocuring and combined photo- and heat-curing. The heat-curing method has such problems that a liquid crystal leaks from a liquid crystal sealing material rendered low in viscosity during curing due to the expansion of the liquid crystal by heating, and that components of the liquid crystal sealing material rendered low in viscosity dissolve in the liquid crystal. These problems are difficult to solve, so the heat-curing method is not yet in practical use.

On the other hand, liquid crystal sealing materials used in the photocuring method include two kinds of cationic polymerization type and radical polymerization type depending on the kinds of photopolymerization initiators. Since a liquid crystal sealing material of cationic polymerization type generates ions in photocuring, when it is used in the liquid crystal dropping process, it has such a problem that the ion components elute in the liquid crystal in the contact state and the specific resistance value of the liquid crystal is reduced. Then, since a liquid crystal sealing material of radical polymerization type has a large curing contraction on photocuring, it has a problem of an insufficient adhesion strength. A problematic point related to both photocuring methods of cationic polymerization type and radical polymerization type involve such a problem that metal wiring parts of an array substrate for liquid crystal display cell and black matrix parts of a color filter substrate generate light-shielded parts of a liquid crystal sealing material where light does not enter, thus causing the light-shielded parts to become uncured.

The heat-curing method and the photocuring method have such various problems, and actually the combined photo- and heat-curing method is believed to be the most practical method. The combined photo- and heat-curing method is characterized in that a liquid crystal sealing material interposed between substrates is irradiated with light to be primarily cured, and is thereafter heated to be secondarily cured. The important characteristics required for a liquid crystal sealing material used in the combined photo- and heat-curing method involve that the liquid crystal sealing material does not contaminate a liquid crystal in every process before and after light irradiation and before and after heat-curing, and especially coutermeasures for the light-shielded parts described before, namely, countermeasures against the elution of the sealing material components from the parts of the sealing material which have not be photocured into the liquid crystal on heat-curing are required. As solving methods, the following are conceived; (1) curing rapidly at a low-temperature before sealing material components elute out, (2) constituting components of a sealing material which hardly elute in a liquid crystal composition, and the like. Of course, the rapid curing at low-temperature accompanies worsening of the pot life during use, which is a practically big problem. Therefore, to obtain a liquid crystal sealing material which has a long pot life and exhibits a low contamination of a liquid crystal, the liquid crystal sealing material is required to be constituted of components which hardly elutes in a liquid crystal composition.

However, since a commonly well known epoxy resin such as bisphenol A epoxy resin and bisphenol F epoxy resin has a good compatibility with the liquid crystal, it cannot be said that said epoxy resin is suitable as the sealing material constitutional component in view of contamination.

In Patent Document 3, use of a partially (meth)acrylated bisphenol A epoxy resin described in Patent Document 4 as the main component of the resin is proposed as the liquid crystal sealing material for dropping process (refer to Patent Document 3 and Patent Document 4). However, although solubility to the liquid crystal is reduced by (meth)acrylation, it cannot be said to be sufficient, and further it is difficult to solve the problem that the liquid crystal is contaminated with the unreacted remaining raw material epoxy resin.

As described above, a combined photo- and heat-curable liquid crystal sealing materials for liquid crystal dropping process, which has been conventionally proposed, cannot be satisfactory in view of contamination into a liquid crystal, adhesive strength, available time for use at room temperature and curability at low temperature.

Patent Document 1: Japanese Patent Application Laying Open (KOKAI) No. 63-179323
Patent Document 2: Japanese Patent Application Laying Open (KOKAI) No. 10-239694
Patent Document 3: Japanese Patent Application Laying Open (KOKAI) No. 2001-133794
Patent Document 4: Japanese Patent Application Laying Open (KOKAI) No. 5-295087

DISCLOSURE OF INVENTION

Problems to be Solved by the Invention

As described hereinbefore, a partially acrylated bisphenol epoxy resin is mainly used as the sealing material for liquid crystal dropping process at present. However, the partially acrylated bisphenol epoxy resin is easily to elute when it is brought into contact with the liquid crystal or when it is heated under the condition of contact. This elution causes irregular orientation of the liquid crystal, exhibits uneven display, and results in the reduction of reliability of panel.

On the contrary, a completely acrylated bisphenol epoxy resin hardly elutes into the liquid crystal relatively, but is not always to be satisfactory. In addition, there is a problem such that when the resin is used for the constituent of liquid crystal sealing material composition, the component other than the resin which can be used is limited due to the high viscosity.

The present invention relates to a liquid crystal sealing material used for liquid crystal dropping process, wherein the liquid crystal is added dropwise to the inside of the wall of the liquid crystal sealing material formed on one substrate, and thereafter another substrate is adhered, followed by exposing the liquid crystal sealing part to light to obtain a liquid crystal display cell by heat-curing, and the radiation curable resin, etc. used as a constituent of a liquid crystal sealing material. The present invention also provides the liquid crystal sealing material, which has extremely low contamination of the liquid crystal throughout the production process, is almost no elution of the sealing material component into the liquid crystal even in the shadowing region, and is excellent in workability for application to the substrate, adhesiveness, adhesive strength and curability at low temperature.

Means to Solve the Problem

The inventors of the present invention have extensively studied the way for solving the above described problem and completed the present invention. Since the radiation curable resin of the present invention has extremely low compatibility with the liquid crystal composition, the liquid crystal sealing material using the same exhibits extremely low possibility of contaminating a liquid crystal. Further, since it has a low viscosity, when it is used as a constituent of the liquid crystal sealing material composition, the usable other component is less limited and the resin with higher viscosity may be possible to be used in combination. Further, the present inventors have found the possibility of filling more fillers.

The present invention relates to the following (1) to (18).

(1) A radiation curable resin represented by the general formula (1):

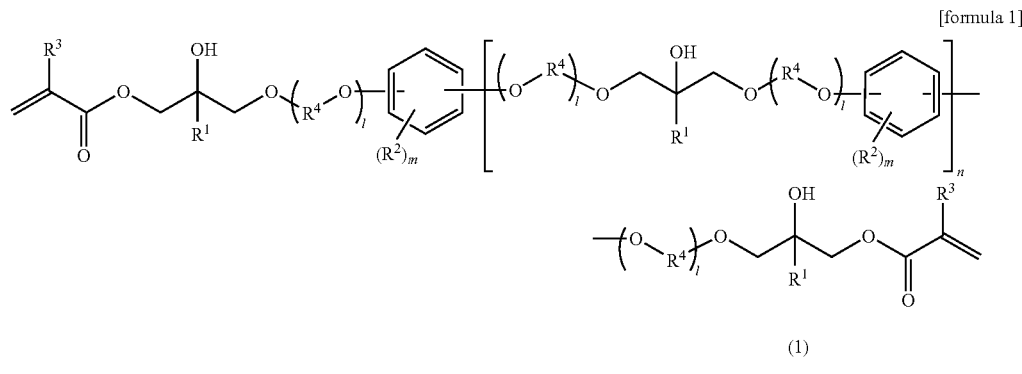

[formula 1]

(1)

wherein R1 represents a hydrogen atom or a methyl group; R2 may be the same or different and represents a hydrogen atom, a halogen atom, a hydroxyl group, a monovalent linear, branched or cyclic alkyl group having 1 to 10 carbon atoms, or an alkoxy group having 1 to 10 carbon atoms; m represents an integer of 1 to 4; R3 represents a hydrogen atom or a methyl group; R4 represents a linear, branched or cyclic alkylene group having 1 to 10 carbon atoms, and a repeating unit number 1 represents a positive numbers ranging from 1 to 5; and a repeating unit number n represents a positive numbers ranging from 0 to 20.

(2) The radiation curable resin according to (1), wherein the radiation curable resin is represented by the general formula (2):

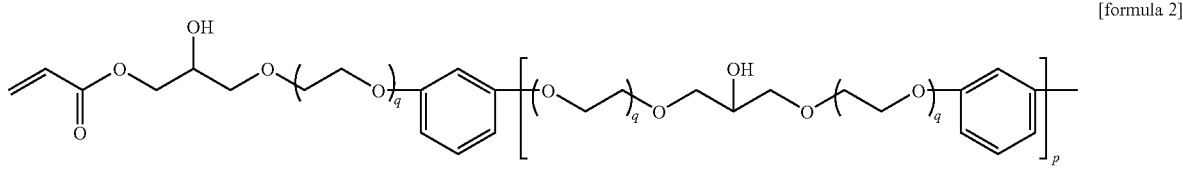

[formula 2]

-continued

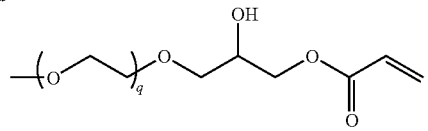

(2)

wherein a repeating unit number p represents a positive numbers ranging from 0 to 20; and a repeating unit number q represents a positive numbers ranging from 1 to 5.

(3) A liquid crystal sealing material characterized by comprising (a) the radiation curable resin represented by the general formula (1) according to (1), (b) a photopolymerization initiator and (c) an inorganic filler having an average particle size of 3 μm or less.

(4) The liquid crystal sealing material according to (3), wherein the radiation curable resin (a) is represented by the general formula (2).

(5) The liquid crystal sealing material according to (3) or (4), wherein a content of the radiation curable resin (a) is from 30% by weight to 80% by weight based on the total liquid crystal sealing material.

(6) The liquid crystal sealing material according to any one of (3) to (5), wherein the radiation curable resin (a) has a viscosity of from 30 to 500 Pa·s.

(7) The liquid crystal sealing material according to any one of (3) to (6), wherein the photopolymerization initiator (b) is a radical photopolymerization initiator.

(8) The liquid crystal sealing material according to (7), wherein the radical photopolymerization initiator is obtainable by reacting a (meth)acrylate monomer having an isocyanate group represented by the general formula (3):

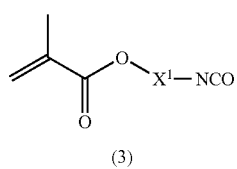

[formula 3]

(3)

wherein X1 represents a linear, branched or cyclic lower alkylene group or aryl group having 1 to 10 carbon atoms with an aryloyl compound having a hydroxyl group represented by the general formula (4):

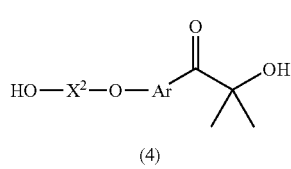

[formula 4]

(4)

wherein X2 represents a linear, branched or cyclic lower alkylene group or arylene group having 1 to 10 carbon atoms, and Ar represents an arylene group.

(9) The liquid crystal sealing material according to (7), wherein the radical photopolymerization initiator is a carbazole initiator.

(10) The liquid crystal sealing material according to any one of (3) to (9), further comprising (d) an epoxy resin and (e) a heat-curing agent.

(11) The liquid crystal sealing material according to (10), wherein the epoxy resin (d) does not elute into a liquid crystal in an amount of 0.5% or more by weight based on the liquid crystal, when said epoxy resin is directly brought into contact with the liquid crystal whose amount is ten times of that of the epoxy resin, and is allowed to stand at 120° C. for 1 hour.

(12) The liquid crystal sealing material according to (10) or (11), wherein the heat-curing agent (e) is a dihydrazide.

(13) The liquid crystal sealing material according to claim 12, wherein the dihydrazide is adipoyl dihydrazide and/or isophthalate dihydrazide and/or a dihydrazide having a valine hydantoin skeleton.

(14) The liquid crystal sealing material according to claim 10 or 11, wherein the heat-curing agent (e) is a polyhydric phenol.

(15) The liquid crystal sealing material according to any one of claims 3 to 14, further comprising (f) a silane coupling agent.

(16) The liquid crystal sealing material according to claim 15, wherein the silane coupling agent (f) has an amino group.

(17) A liquid crystal display cell sealed with a cured product obtainable by curing the liquid crystal sealing material according to any one of (3) to (16).

(18) A process for manufacturing a liquid crystal display cell characterized by comprising adding a liquid crystal dropwise to the inside of a wall of the liquid crystal sealing material according to any one of (3) to (16) formed on one substrate, followed by laminating the other substrate thereon.

Effects of the Invention

The present invention provides the liquid crystal sealing material having strong adhesive strength and low possibility of contaminating liquid crystal. Further, a production of highly reliable liquid crystal display cell could be achieved by using the liquid crystal sealing material of the present invention in the liquid crystal dropping process.

BEST MODE FOR CARRYING OUT THE INVENTION

Hereinafter, the present invention will be described in detail.

The radiation curable resin of the present invention is represented by the general formula (1). In the present invention, the radiation curability means the property of curing by irradiating the radiation such as ultraviolet ray and electron ray.

The liquid crystal sealing material of the present invention is characterized by comprising (a) a radiation curable resin represented by the general formula (1), (b) a photopolymerization initiator and (c) a filler having an average particle size of 3 μm or less as essential components.

In the radiation curable resin (a) represented by the general formula (1), R1 represents a hydrogen atom or a methyl group, preferably a hydrogen atom. R2 may be the same or different and represents a hydrogen atom, a halogen atom, a hydroxyl group, a monovalent linear, branched or cyclic alkyl group having 1 to 10 carbon atoms, or an alkoxy group having 1 to 10 carbon atoms. A halogen atom indicates a fluorine atom, chlorine atom, and the like. A monovalent linear, branched or cyclic alkyl group having 1 to 10 carbon atoms indicates methyl, ethyl, n-propyl, i-propyl, t-butyl, cyclopentyl, cyclohexyl, and the like. An alkoxy group having 1 to 10 carbon atoms indicates methoxy, ethoxy, n-propoxy, i-propoxy, t-butoxy, and the like. R2 is most preferably a hydrogen atom. R3 represents a hydrogen atom or a methyl group. A monovalent linear, branched or cyclic alkylene group having 1 to 10 carbon atoms of R4 indicates methylene, ethylene, n-propylene, i-propylene, t-butylene, cyclopentylene, cyclohexylene, and the like. Most preferably, R4 is ethylene. m represents an integer of 1 to 4. The repeating unit number 1 represents a positive numbers ranging from 1 to 5, preferably from 1 to 1.5. The repeating unit number n represents a positive numbers ranging from 0 to 20, preferably from 0 to 1.5.

In the radiation curable resin (a) represented by the general formula (1), the radiation curable resin represented by the general formula (2) is specifically preferable in the present invention, and p is preferably the positive numbers ranging from 0 to 20, most preferably positive numbers ranging from 0 to 1.5, and q is preferably the positive numbers ranging from 1 to 5, most preferably positive numbers ranging from 1 to 1.5.

The radiation curable resin (a) used in the present invention can be obtained by such that alkylene glycol added resorcin diglycidyl ether, alkylene glycol added catechol diglycidyl ether, alkylene glycol added hydroquinone diglycidyl ether or the like is subjected to esterification reaction with (meth)acrylic acid in equivalent amounts of the epoxy group. This synthetic reaction can be performed by the generally known method. For example, to ethylene glycol added resorcin diglycidyl ether, (meth)acrylic acid in equivalent amount is added with catalyst (e.g. benzyl dimethylamine, triethylamine, benzyltrimethylammonium chloride, triphenylphosphine, triphenylstibine, etc.) and polymerization inhibitor (e.g. methoquinone, hydroquinone, methylhydroquinone, phenothiazine, dibutyl hydroxytoluene, etc.), and the mixture is subjected to esterification reaction, for example, at 80 to 110° C. Thus obtained (meth)acrylated ethylene glycol resorcin diglycidyl ether is a resin having (meth)acryloyl group which is radically polymerizable.

Further, the radiation curable resin (a) used in the present invention can also be obtained by such that ethylene glycol added resorcin, ethylene glycol added catechol, ethylene glycol added hydroquinone or the like is reacted with an equivalent or excess amount of glycidyl (meth)acrylate based on OH group thereof. This synthetic reaction can be performed by the generally known method. For example, to ethylene glycol added resorcin, glycidyl (meth)acrylate in equivalent amount of the OH group thereof is added together with catalyst (e.g. benzyl dimethylamine, triethylamine, benzyltrimethylammonium chloride, triphenylphosphine, triphenylstibine, etc.) and polymerization inhibitor (e.g. methoquinone, hydroquinone, methylhydroquinone, phenothiazine, dibutyl hydroxytoluene, etc.), and the mixture is subjected to esterification reaction at 80 to 110° C. Thus obtained (meth)acrylated resorcin diglycidyl ether is a resin having (meth)acryloyl group which is radically polymerizable.

Further, in the present invention, the content of the radiation curable resin (a) in the liquid crystal sealing material is generally about 30% by weight to 80% by weight based on total liquid crystal sealing material, preferably about 40% by weight to 75% by weight. Viscosity of the radiation curable resin (a) is approximately 1 to 500 Pa·s, preferably 30 to 500 Pa·s.

The photopolymerization initiator (b) used in the present invention can be any photopolymerization initiator such as radical type initiator and cation type initiator. From the standpoint of the possibility of contaminating liquid crystals, radical type initiator is preferable. The radical type initiator includes benzyl dimethyl ketal, 1-hydroxycyclohexyl phenyl ketone, diethylthioxanthone, benzophenone, 2-ethylanthraquinone, 2-hydroxy-2-methylpropiophenone, 2-methyl-[4-(methylthio)phenyl]-2-morphorino-1-propane, 2,4,6-trimethylbenzoyldiphenylphosphine oxide, and the like. Preferably, the photopolymerization initiator has sensitivity for wavelength at around i-line (365 nm), which is relatively less effect to the properties of liquid crystal, or the photopolymerization initiator has low possibility of contaminating liquid crystal.

The photopolymerization initiator having sensitivity for wavelength at around i-line (365 nm), which is relatively less effect to the properties of liquid crystal includes carbazole initiator such as 3,6-bis(2-methyl-2-morphorinopropionyl)-9-n-octylcarbazole.

In addition, the photopolymerization initiator (b) having low possibility of contaminating liquid crystal includes the radical type photopolymerization initiator obtainable by reacting a (meth)acrylate monomer having an isocyanate group represented by the general formula (3) with an aryloyl compound having a hydroxyl group represented by the general formula (4).

Radical reactive (meth)acrylate monomer having isocyanate group represented by the general formula (3) is not specifically limited as long as it has a chemical structure having isocyanate group which can react with hydroxyl group and radical polymerization group within the molecule. Lower alkylene group of X1 indicates $C_1$ to $C_{10}$ linear, branched or cyclic, substituted or unsubstituted, saturated or unsaturated hydrocarbon, preferably $C_1$ to $C_{10}$ linear or branched alkylene group such as ethylene group, n-propylene group, i-propylene group and t-butylene group. Specifically preferable example is 2-isocyanate ethyl methacrylate wherein X1 is ethylene group in the general formula (3).

Aryloyl compound having hydroxyl group represented by the general formula (4) is not limited as long as the aryloyl compound has hydroxyl group which can react with isocyanate group in one molecule. Lower alkylene group of X2 indicates a linear, branched or cyclic, substituted or unsubstituted, and saturated or unsaturated hydrocarbon having 1 to 10 carbon atoms, preferably a linear or branched alkylene group having 1 to 10 carbon atoms such as an ethylene group, n-propylene group, i-propylene group and t-butylene group, and an arylene group of X2 indicates a phenylene group, naphthylene group, biphenylene group, pyrrolylene group, thienylene group, and the like. Specifically preferable example is 2-hydroxy-4'-hydroxyethoxy-2-methylpropyophenone wherein X2 is ethylene group and Ar is phenylene group in the general formula (4).

These two types of compounds are subjected to condensation reaction at 70° C. to 100° C. to obtain the desired radical polymerization initiator. If necessary, solvent can be used in this step. Since this radical polymerization initiator is solid form, it can be easily purified by recrystallization. The purified compound by recrystallization is preferably used from the standpoint of reliability.

In the liquid crystal sealing material of the present invention, a blending ratio of the photopolymerization initiator (b) to (a) component is approximately 0.05 to 10 pts.wt. to the (a) component 100 pts.wt. When amount of the photopolymerization initiator is smaller than 0.05 pts.wt., the photocuring reaction may not be sufficient, and when amount of the photopolymerization initiator is larger than 10 pts.wt., the photopolymerization initiator is oversupplied and as a result problems on contaminating the liquid crystal with excessive photopolymerization initiator and decreased properties of cured resin may occur.

The inorganic filler (c) used in the present invention includes fused silica, crystalline silica, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide, asbestos, and the like, preferably fused silica, crystalline silica, silicon nitride, boron nitride, calcium carbonate, barium sulfate, calcium sulfate, mica, talc, clay, alumina, aluminum hydroxide, calcium silicate and aluminum silicate, and more preferably fused silica, crystalline silica, alumina and talc. The inorganic filer may be mixed with two or more.

Average particle size of the inorganic filler used in the present invention is 3 μm or less, and preferable lower limit thereof is approximately 0.003 μm. If the average particle size is larger than 3 μm, formation of the gap can not be made perfectly when the upper and lower glass substrates are laminated during the production of liquid crystal cell. Measurement of average particle size of the inorganic filler was performed by using particle size distribution measurement equipment with laser diffraction and scattering method (dry system) (Seishin Enterprise Co., Ltd., LMS-30).

Content of the inorganic filler used in the present invention in the liquid crystal sealing material is generally 5 to 40% by weight, preferably 15 to 25% by weight. When the content of inorganic filler is lower than 5% by weight, the adhesive strength to the glass substrate is decreased and the adhesive strength reduction after adsorption of moisture tends to deteriorate due to inferior reliability to humidity. Further, when content of the inorganic filler is more than 40% by weight, the content of the filler becomes too much excess so that it is hardly crushable and as a result the gap formation of liquid crystal cell may be impossible.

The liquid crystal sealing material of the present invention is, in addition to three essential components (a), (b) and (c) hereinabove, preferably to contain epoxy resin (d). The epoxy resin (d) used in the present invention is not limited. However, in view of possibility of contaminating liquid crystal, the epoxy resin which does not elute in an amount of 0.5% or more by weight based on that of the epoxy resin when the epoxy resin directly contacts with the liquid crystal in ten times amount of the epoxy resin and is allowed to stand at 120° C. for 1 hour, is preferable. Such an epoxy resin includes, but not limited to bisphenol S type epoxy resin represented by the formula (5):

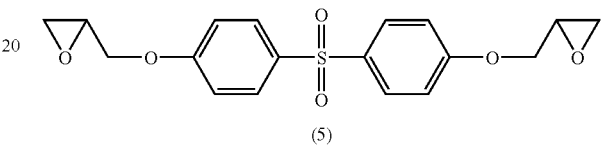

[formula 5]

(5)

multimer of resorcin diglycidyl ether represented by the general formula (6):

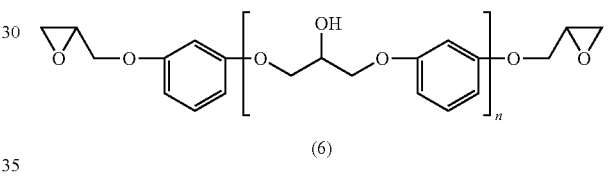

[formula 6]

(6)

wherein n represents an integer of 1 to 10, diglycidyl ether of ethylene oxide added bisphenol S represented by the formula (7):

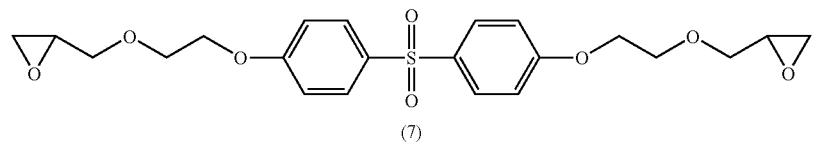

[formula 7]

(7)

and diglycidyl ether of ethylene oxide added bisphenol fluorene represented by the formula (8):

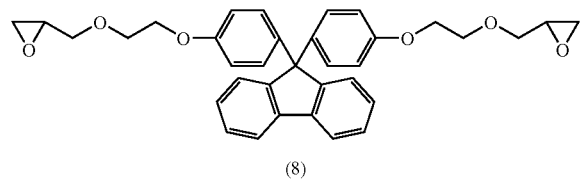

[formula 8]

(8)

Content of such epoxy resin (d) in the liquid crystal sealing material is in general preferably 1% by weight to 40% by weight based on total liquid crystal sealing material, more preferably approximately 5% by weight to 30% by weight.

Quantitative measurement of an amount of elution can be performed by using gas chromatography with use of pentadecane as the internal standard substance.

Amount of hydrolyzable chlorine of the epoxy resin used in the present invention is preferably 600 ppm or less, more preferably 300 ppm or less. When amount of the hydrolyzable chlorine is more than 600 ppm, problem on contaminating the liquid crystal with the liquid crystal sealing material may occur. Amount of the hydrolyzable chlorine can be quantitatively measured by for example such that about 0.5 g of epoxy resin is dissolved in 20 ml of dioxane, followed by refluxing with 5 ml of 1 N-KOH/ethanol solution for 30 minutes, and then, the titration with 0.01 N-silver nitrate solution is performed.

The liquid crystal sealing material of the present invention preferably contains heat-curing agent (e). The heat-curing agent is not limited as long as it is reacted with the epoxy resin to form cured substance. However, it is important that the initiation of the reaction occurs uniformly and immediately without contaminating the liquid crystal with the liquid crystal sealing material on heating and that time-dependent change in viscosity is small at room temperature in use. Curability at low temperature, generally at 120° C. for about 1 hour, is required as the heat-curing condition in the liquid crystal dropping process in order to minimize the deterioration in special characteristics of the sealed liquid crystal. Considering the above, it is preferable to use particularly polyfunctional hydrazide and polyhydric phenol as the heat-curing component in the liquid crystal sealing material of the present invention.

Polyfunctional dihydrazide in this case means a compound having two or more hydrazide groups in a molecule and includes, but not limited to carbohydrazide, oxalic acid dihydrazide, malonic acid dihydrazide, succinic acid dihydrazide, adipic acid dihydrazide, pimelic acid dihydrazide, suberic acid dihydrazide, azelaic acid dihydrazide, sebacic acid dihydrazide, dodecanediodihydrazide, hexadecanediohydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4-bisbenzene dihydrazide, 1,4-naphthoic acid dihydrazide, 2,6-pyridine dihydrazide, 1,2,4-benzene trihydrazide, pyromellitic acid tetrahydrazide, 1,4,5,8-naphthoic acid tetrahydrazide, and dihydrazide having valine hydantoin skeleton such as 1,3-bis (hydrazinocarbonoethyl)-5-isopropyl hydantoin. When the polyfunctional dihydrazide is used as the curing agent, in order to prepare latent curing agent, fine particles thereof is preferably dispersed homogeneously. Among the polyfunctional dihydrazide, dihydrazide is preferable, and specifically preferable dihydrazide is isophthalic acid dihydrazide, adipic acid dihydrazide and dihydrazide having valine hydantoin skeleton in view of the possibility of contaminating the liquid crystal.

Polyhydric phenol indicates phenol having two or more hydroxyl groups in a molecule, and includes, but not limited to bisphenol A, bisphenol F, bisphenol S, bisphenol E, phenol novolac, cresol novolac, tris-phenol methane type novolac, biphenyl type novolac, naphthalene type novolac, and the like.

Average particle size of the hydrazide of (e) component is preferably 3 μm or less, more preferably 2 μm or less, since larger particle size causes such a deterioration that the gap formation in laminating the upper and the lower glass substrates cannot be performed well in the production of narrow-gap liquid crystal cell. Similarly, maximum particle size is preferably 8 μm or less, more preferably 5 μm or less. Measurement of particle size of the curing agent was performed by using particle size distribution measurement equipment with laser diffraction and scattering method (dry system) (Seishin Enterprise Co., Ltd., LMS-30). In addition, mean particle size is preferably prepared not to make extremely small (e.g. 0.1 μm or less).

In the liquid crystal sealing material of the present invention, blending ratio of (e) component is preferably 0.6 to 1.5 equivalent, more preferably 0.8 to 1.2 equivalent, based on the equivalent amount of epoxy group in (d) component. If the amount of the (e) component is smaller than 0.6 equivalent, the heat-curing reaction becomes insufficient, which causes lower adhesive strength and glass transition point. On the contrary, if the equivalent is more than 1.5, the curing agent remains and thereby adhesive strength would reduce and the pot life would deteriorate.

The liquid crystal sealing material of the present invention contains preferably silane coupling agent (f) in order to improve adhesive strength. Silane coupling agent includes (3-glycidoxypropyl)trimethoxysilane, (3-glycidoxypropylmethyl)dimethoxysilane, (3-glycidoxypropylmethyl) dimethoxysilane, 2-(3,4-epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-(vinylbenzylamino) ethyl)3-aminopropyltrimethoxysilane hydrochloride, (3-methacryloxypropyl)trimethoxysilane, 3-chloropropylmethyldimethoxysilane, 3-chloropropyltrimethoxysilane, etc. These silane coupling agents may be used in combination with two types or more. Among them, in order to obtain better adhesive strength, silane coupling agent is preferably silane coupling agent having amino group. The addition of silane coupling agent provides the liquid crystal sealing material having improved adhesive strength and reliability with superior moisture resistance.

Content of such the silane coupling agent (f) in the liquid crystal sealing material is in general approximately 0.01% by weight to 5% by weight, preferably approximately 0.02% by weight to 1% by weight based on the total liquid crystal sealing material.

To the liquid crystal sealing material according to the present invention, if required, organic solvent, organic filler and additives such as pigment, leveling agent, and antifoam agent can be added.

In order to obtain the liquid crystal sealing material of the present invention, for example, at first, (a) component, (b) component, (d) component, and further if necessary, (f) component are dissolved and mixed. Subsequently, to the mixture, (e) component, (c) component and, if required, predetermined amount of antifoam agent, leveling agent and organic filler are added, followed by uniformly mixing by using known mixing equipment, such as a triaxial roll, sand mill, ball mill, and the like, to obtain the liquid crystal sealing material of the present invention.

The liquid crystal display cell of the present invention is the liquid crystal display cell wherein the liquid crystal is sealed in the inside of wall of the liquid crystal sealing material hereinabove, and the liquid crystal is sealed by the cured substance obtained by curing the liquid crystal sealing material. Specifically, said crystal display cell has a pair of substrates oppositely arranged with a prescribed gap on which prescribed electrodes are formed, and the peripheries of the substrates are sealed with the liquid crystal sealing material of the present invention, and a liquid crystal is enclosed in the gap. The kind of the enclosed liquid crystal is not especially limited. Herein, the substrates are constituted of a combination of substrates, at least one of which has light transparency, such as a glass, quartz, plastic or silicon. The manufacturing method involves, for example, adding spacers (gap controlling material) such as glass fiber to a liquid crystal sealing material of the present invention, then applying the liquid crystal sealing material on the periphery of one of the pairs of substrates by a dispenser, etc. as the wall is formed, dropping a liquid crystal inside of the wall of the liquid crystal sealing material, overlapping the other glass substrate thereon under vacuum, and adjusting the gap. After forming the gap, the liquid crystal sealing part is irradiated with ultraviolet rays by an ultraviolet irradiation device to photocure the liquid crystal sealing part. The ultraviolet irradiation amount is preferably 500 mJ/cm² to 6,000 mJ/cm², more preferably 1,000 mJ/cm² to 4,000 mJ/cm². Thereafter, the curing at 90 to 130° C. for 1 to 2 h gives a liquid crystal display cell of the present invention. The liquid crystal display cell of the present invention thus obtained has no display defects by the contamination into the liquid crystal and excels in the adhesiveness and the moisture resistance reliability. The spacer includes, for example, glass fiber, silica bead and polymer bead. The diameter thereof is different depending on objects, and generally 2 to 8 μm, preferably 4 to 7 μm. The amount used is preferably generally 0.1 to 4 pts.wt. based on 100 pts.wt. of the liquid crystal sealing material of the present invention, further preferably 0.5 to 2 pts.wt., most preferably about 0.9 to 1.5 pts.wt.

EXAMPLES

The following Examples will further describe the invention in detail.

Synthesis Example 1

Synthesis of epoxy acrylate of ethylene glycol added resorcin diglycidyl ether (Epoxyacrylate A): A compound of the general formula (2) wherein p=0, q=1 and bonding coordination of phenylene is at position m Ethylene glycol added resorcin diglycidyl ether resin was dissolved in toluene, and added dibutylhydroxytoluene as the polymerization inhibitor therein, then temperature was risen up to 60° C. Thereafter, acrylic acid 100% equivalent to epoxy group was added, further temperature was risen up to 80° C., then trimethylammonium chloride as the reaction catalyst was added thereto and stirred at 98° C. for about 50 hours. Obtained reaction mixture was washed with water, and toluene was distilled out to obtain the desired epoxy acrylate of ethylene glycol added resorcin (Epoxyacrylate A).

Synthesis Example 2

Synthesis of Epoxy Acrylate of Resorcin Diglycidyl Ether (Epoxyacrylate B)

Resorcin diglycidyl ether resin was dissolved in toluene, and added dibutylhydroxy toluene as the polymerization inhibitor therein. Then temperature was risen up to 60° C. Thereafter, acrylic acid in 100% equivalent amount to epoxy group was added, and further temperature was risen up to 80° C., followed by adding trimethylammonium chloride as the reaction catalyst and stirring at 98° C. for about 50 hours. Obtained reaction mixture was washed with water, and toluene was distilled out to obtain epoxy acrylate of resorcin (Epoxyacrylate B).

Synthesis Example 3

Synthesis of Bisphenol F Epoxy Acrylate (Epoxyacrylate C)

Bisphenol F epoxy resin (Nihon Kayaku Co., Ltd. RE-404P, epoxy equivalent 160 g/eq., amount of hydrolysis 30 ppm) was dissolved in toluene, and added dibutylhydroxy toluene as the polymerization inhibitor therein, then temperature was risen up to 60° C. Thereafter, acrylic acid in 100% equivalent amount to epoxy group was added, further temperature was risen up to 80° C. Then trimethylammonium chloride as the reaction catalyst was added thereto, followed by stirring at 98° C. for about 50 hours. The resultant reaction mixture was washed with water, and toluene was distilled out to obtain epoxy acrylate of bisphenol F (Epoxyacrylate C).

Test Example 1

Test for Contamination into the Liquid Crystal (Only Heating)

0.1 g of each epoxyacrylate A to C synthesized hereinabove was set in each sample tube, and 1 g of the liquid crystal (Merck, MLC-6866-100) was added therein to contact with each other directly. The tubes were kept in the oven at 120° C. for 1 hour, and allowed to stand at room temperature for 0.5 hour. After taking out only the liquid crystal, the component eluted into the liquid crystal was quantitatively measured by gas chromatography using pentadecane as the internal standard substance. In Table 1, the amount of the eluted substance was expressed by percent by weight based on the liquid crystal. Epoxy acrylate of ethylene glycol added resorcin diglycidyl ether (Epoxyacrylate A) is eluted only about ⅓ as compared with 100% epoxyacrylate of bisphenol F epoxy (Epoxyacrylate C) in spite of low viscosity. Further, epoxy acrylate of ethylene glycol added resorcin diglycidyl ether (Epoxyacrylate A) eluted to the similar extent to epoxy acrylate of resorcin diglycidyl ether (Epoxyacrylate B), whereas the viscosity thereof was not more than the half. Therefore, it can be understood that epoxy acrylate of ethylene glycol added resorcin diglycidyl ether (Epoxyacrylate A) exhibits less elution to the liquid crystal as well as very low viscosity as compared with other epoxyacrylate.

TABLE 1

| | Epoxyacrylate A | Epoxyacrylate B | Epoxyacrylate C |
|---|---|---|---|
| Viscosity (Pa·s) | 12 | 50 | 150 |
| Quantitative measurement of eluted substance (GC) | 0.13% | 0.11% | 0.37% |

Synthesis Example 4

Synthesis of Radial Photopolymerization Initiator (A)

155 g of 2-isocyanate ethyl methacrylate (Showa Denko K. K., Karenz MOI) as radical reactive acrylate monomer having isocyanate group and 224 g of 2-hydroxy-4'-hydroxyethoxy-2-methylpropiophenone (Ciba Specialty Chemicals, Co. Ltd. IRG-2959) were set in the reaction vessel and 0.76 g of methylhydroquinone as the polymerization inhibitor was added thereto. Temperature was risen up to 80° C. and stirred for about 26 hours. Obtained reaction mixture was dissolved in the mixed solvent of methyl isobutyl ketone and toluene and washed with water. Then methyl isobutyl ketone and toluen were distilled out and the product was recrystallized by using ethyl acetate and n-hexane to obtain the objective radical photopolymerization initiator.

Example 1

80 pts.wt. of epoxyacrylate A obtained in the Synthesis Example 1, 20 pts.wt. of EBPS-300 as epoxy resin (Nihon Kayaku K. K., epoxy equivalent 233 g/eq., bisphenol S epoxy resin), 7.2 pts.wt. of radical photopolymerization initiator (A) obtained in Synthesis Example 4 as the radical photopolymerization initiator and 1.2 pts.wt. of aminosilane coupling agent (N-β(aminoethyl)γ-aminopropyltrimethoxysilane, Shin-Etsu Silicone KBM-603) were dissolved with heating at 90° C. to obtain the resin solution. After cooling to room temperature, 5 pts.wt. of adipic acid dihydrazide (trade name ADH-J, Otsuka Chemical Co., Ltd., Jet mill grinding grade product was further ground, m.p. 179° C., activated hydrogen equivalent 43.5 g/eq., average particle size 1.0 μm, maximum particle size 5.0 μm), 30 pts.wt. of alumina (SPC-A1, average particle size 1.0 μm) and 7 pts.wt. of core shell rubber fine particles: Paraloid EXL-2655 (Kureha Corp. Core layer: crosslinked polybutadiene, Shell layer: methacrylate alkyl-styrene copolymer, average particle size 200 nm) were added, and kneaded by a triaxial roll to obtain the liquid crystal sealing material of the present invention. Viscosity of the liquid crystal sealing material (25° C.) was 200 Pa·s (measured by using Type R viscometer (Toki Sangyo Co., Ltd.)).

Example 2

80 pts.wt. of epoxyacrylate A obtained in the Synthesis Example 1, 20 pts.wt. of EBPS-300 as epoxy resin (Nihon Kayaku K. K., epoxy equivalent 233 g/eq., bisphenol S epoxy resin), 7.2 pts.wt. of radical photopolymerization initiator (A) obtained in Synthesis Example 4 as the radical photopolymerization initiator and 1.2 pts.wt. of aminosilane coupling agent (N-β(aminoethyl)γ-aminopropyltrimethoxysilane, Shin-Etsu Silicone KBM-603) were dissolved with heating at 90° C. to obtain the resin solution. After cooling to room temperature, 6.5 pts.wt. of amicure VDH (1,3-bis(hydrazinocarbonoethyl)-5-isopropyl hydantoin: Product of Ajinomoto Fine-Techno Co. Inc. was fine ground by using Jet mill), 30 pts.wt. of alumina (SPC-A1, average particle size 1.0 μm) and 7 pts.wt. of core shell rubber fine particles: Paraloid EXL-2655 (Kureha Corp. Core layer: crosslinked polybutadiene, Shell layer: methacrylate alkyl-styrene copolymer, average particle size 200 nm) were added, and kneaded by a triaxial roll to obtain the liquid crystal sealing material of the present invention. Viscosity of the liquid crystal sealing material (25° C.) was 270 Pa·s (measured by using Type R viscometer (Toki Sangyo Co., Ltd.)).

Example 3

80 pts.wt. of epoxyacrylate A obtained in the Synthesis Example 1, 20 pts.wt. of EBPS-300 as epoxy resin (Nihon Kayaku K. K., epoxy equivalent 233 g/eq., bisphenol S epoxy resin), 1.8 pts.wt. of 3,6-bis(2-methyl-2-morphorinopropionyl)-9-n-octyl carbazole (ADEKA Corp., Adeka Optomer N-1414) as the radical photopolymerization initiator and 1.2 pts.wt. of aminosilane coupling agent (N-β(aminoethyl)γ-aminopropyltrimethoxysilane, Shin-Etsu Silicone KBM-603) were dissolved with heating at 90° C. to obtain the resin solution. After cooling to room temperature, 5 pts.wt. of adipic acid dihydrazide (trade name ADH-J, Otsuka Chemical Co., Ltd., Jet mill grinding grade product was further ground, m.p. 179° C., activated hydrogen equivalent 43.5 g/eq., average particle size 1.0 μm, maximum particle size 5.0 μm), 30 pts.wt. of alumina (SPC-A1, average particle size 1.0 μm), and 7 pts.wt. of core shell rubber fine particles: Paraloid EXL-2655 (Kureha Corp. Core layer: crosslinked polybutadiene, Shell layer: methacrylate alkyl-styrene copolymer, average particle size 200 nm) were added, and kneaded by a triaxial roll to obtain the liquid crystal sealing material of the present invention. Viscosity of the liquid crystal sealing material (25° C.) was 200 Pa·s (measured by using Type R viscometer (Toki Sangyo Co., Ltd.)).

Comparative Example 1

80 pts.wt. of epoxyacrylate B obtained in the Synthesis Example 2, 20 pts.wt. of EBPS-300 as epoxy resin (Nihon Kayaku K. K., epoxy equivalent 233 g/eq., bisphenol S epoxy resin), 7.2 pts.wt. of radical photopolymerization initiator (A) obtained in Synthesis Example 4 as the radical photopolymerization initiator and 1.2 pts.wt. of aminosilane coupling agent (N-β(aminoethyl)γ-aminopropyltrimethoxysilane, Shin-Etsu Silicone KBM-603) were dissolved with heating at 90° C. to obtain the resin solution. After cooling to room temperature, 5 pts.wt. of adipic acid dihydrazide (trade name ADH-J, Otsuka Chemical Co., Ltd., Jet mill grinding grade product was further ground, m.p. 179° C., activated hydrogen equivalent 43.5 g/eq., average particle size 1.0 μm, maximum particle size 5.0 μm), 30 pts.wt. of alumina (SPC-A1, average particle size 1.0 μm) and 7 pts.wt. of core shell rubber fine particles: Paraloid EXL-2655 (Kureha Corp. Core layer: crosslinked polybutadiene, Shell layer: methacrylate alkyl-styrene copolymer, average particle size 200 nm) were added, and kneaded by a triaxial roll to obtain the liquid crystal sealing material of the Comparative Example. Viscosity of the liquid crystal sealing material (25° C.) was 250 Pa·s (measured by using Type R viscometer (Toki Sangyo Co., Ltd.)).

Comparative Example 2

80 pts.wt. of epoxyacrylate C obtained in the Synthesis Example 3, 20 pts.wt. of EBPS-300 as epoxy resin (Nihon Kayaku K. K., epoxy equivalent 233 g/eq., bisphenol S epoxy resin), 7.2 pts.wt. of radical photopolymerization initiator (A) obtained in Synthesis Example 4 as the radical photopolymerization initiator and 1.2 pts.wt. of aminosilane coupling agent (N-β(aminoethyl)γ-aminopropyltrimethoxysilane, Shin-Etsu Silicone KBM-603) were dissolved with heating at 90° C. to obtain the resin solution. After cooling to room temperature, 5 pts.wt. of adipic acid dihydrazide (trade name ADH-J, Otsuka Chemical Co., Ltd., Jet mill grinding grade product was further ground, m.p. 179° C., activated hydrogen equivalent 43.5 g/eq., average particle size 1.0 μm, maximum particle size 5.0 μm), 30 pts.wt. of alumina (SPC-A1, average particle size 1.0 μm) and 7 pts.wt. of core shell rubber fine particles: Paraloid EXL-2655 (Kureha Corp. Core layer: crosslinked polybutadiene, Shell layer: methacrylate alkyl-styrene copolymer, average particle size 200 nm) were added, and kneaded by a triaxial roll to obtain the liquid crystal sealing material of the Comparative Example. Viscosity of the liquid crystal sealing material (25° C.) was 350 Pa·s (measured by using Type R viscometer (Toki Sangyo Co., Ltd.)).

Test Example 2

Test for contamination into a liquid crystal (heating or UV+ heating), adhesive strength test, and glass transition point on the liquid crystal sealing material obtained in Examples 1 and 2, and Comparative Examples 1 and 2 were performed and measured. Test for contamination into a liquid crystal (heating or UV+ heating):

Measurement of specific resistance of contacted liquid crystal as an indicator of contamination on the liquid crystal was performed as follows. 0.1 g of the liquid crystal sealing material was set in the sample tube, and 1 mL of the liquid crystal (Merck, MLC-6866-100) was added thereto. Then, after UV irradiation at 2000 mJ/cm$^2$ by using UV irradiator, the tubes were kept in the oven at 120° C. for 1 hour, thereafter allowed to stand at room temperature for 0.5 hour. After taking out only the liquid crystal from the treated sample tube, the amount of the component eluted into the liquid crystal was quantitatively measured by gas chromatography using pentadecane as the internal standard substance. Results are shown in Table 2. Separately, results of measurement on contamination under heating (samples were kept in the oven at 120° C. for 1 hour, thereafter allowed to stand at room temperature for 0.5 hour) are also shown in Table 2.

Adhesive Strength Test:

To 100 g of the obtained liquid crystal sealing material, 1 g of 5 μm glass fiber as the spacer was added and mixed with stirring. This liquid crystal sealing material was spread on the glass substrate of 50 mm×50 mm, and the glass piece of 1.5 mm×1.5 mm, was adhered on said liquid crystal sealing material. Then, after irradiating ultraviolet rays of 2000 mJ/cm$^2$, by using UV irradiator, the substrate was kept in the oven at 120° C. for 1 hour to cure the sealing material. A shearing strength of the glass piece was measured. Results are shown in Table 2.

Glass Transition Point:

Sample for measurement was prepared as follows. The obtained liquid crystal sealing material was sandwiched in the polyethylene terephthalate (PET) films to prepare 100 μm thin membrane. Then, after the membrane was irradiated with ultraviolet rays at 2000 mJ/cm$^2$ by UV irradiator, the irradiated membrane was kept in the oven at 120° C. for 1 hour to cure the sealing material. After curing, PET film was peeled away and the cured product was used as a sample. Glass transition point was measured in the tension mode by using TMA test equipment (Sinku Riko K. K., ULVAC-RIKO Inc.). Results are shown in Table 2.

Referring to the results in Table 2, it can be understood that the amount of eluted liquid crystal sealing material obtained in Examples 1 and 2 into the liquid crystal was significantly smaller as compared with the liquid crystal sealing material in the Comparative Example 2. Further, although the contamination into the liquid crystal with the liquid crystal sealing material obtained from the Comparative Example 1 was almost equal level with that of the liquid crystal sealing material obtained from Examples 1 and 2, the adhesive strength of the sealing material in the Comparative Example 1 was smaller. It should be noted that components in Comparative Examples 1 and 2 is only different on the point of (a) component as compared with that of Example 1.

Consequently, the liquid crystal sealing materials of Examples 1 and 2 are significantly superior in the reliability on the contamination into the liquid crystal and have superior adhesiveness as compared with the liquid crystal sealing material of Comparative Examples 1 and 2.

TABLE 2

|  | Example 1 | Example 2 | Example 3 | Comparative Example 1 | Comparative Example 2 |
|---|---|---|---|---|---|
| Viscosity (Pa · s) | 200 | 270 | 210 | 250 | 350 |
| Adhesive strength (MPa) | 75 | 79 | 75 | 70 | 75 |
| Grass transition temperature (° C.) | 95 | 95 | 95 | 100 | 90 |
| Test for contamination into a liquid crystal (120° C. × 1 hr) | | | | | |
| Amount of eluate (ppm) | | | | | |
| Epoxyacrylate A | 200 | 160 | 200 | | |
| Epoxyacrylate B | | | | 200 | |
| Epoxyacrylate C | | | | | 800 |
| Bis S epoxy | 250 | 200 | 250 | 250 | 250 |
| Total | 450 | 360 | 450 | 450 | 1050 |
| Test for contamination into a liquid crystal (UV2J + 120° C. × 1 hr) | | | | | |
| Amount of eluate (ppm) | | | | | |
| Epoxyacrylate A | 100 | 80 | 100 | | |
| Epoxyacrylate B | | | | 100 | |
| Epoxyacrylate C | | | | | 480 |
| Bis S epoxy | 100 | 50 | 100 | 100 | 100 |
| Total | 200 | 130 | 200 | 200 | 580 |

The invention claimed is:

1. A radiation curable resin represented by the general formula (1):

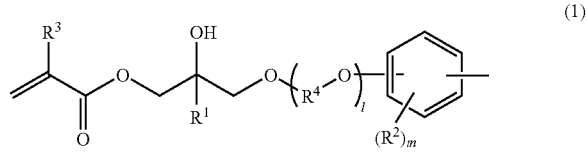

-continued

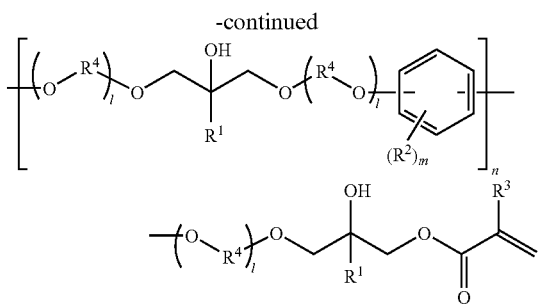

wherein $R^1$ represents a hydrogen atom or a methyl group; $R^2$ may be the same or different and represents a hydrogen atom, a halogen atom, a hydroxyl group, a monovalent linear, branched or cyclic alkyl group having 1 to 10 carbon atoms, or an alkoxy group having 1 to 10 carbon atoms; m represents an integer of 1 to 4; $R^3$ represents a hydrogen atom or a methyl group; $R^4$ represents a linear, branched or cyclic alkylene group having 1 to 10 carbon atoms, and a repeating unit number l represents a positive numbers ranging from 1 to 5; and a repeating unit number n represents a positive numbers ranging from 0 to 20.

2. The radiation curable resin according to claim 1, represented by the general formula (2):

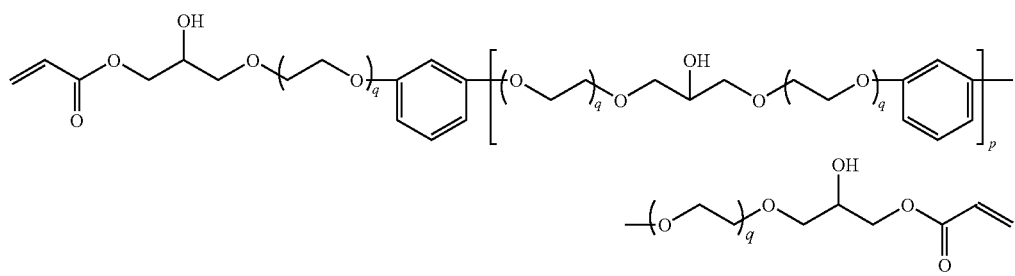

wherein a repeating unit number p represents a positive numbers ranging from 0 to 20; and a repeating unit number q represents a positive numbers ranging from 1 to 5.

3. A liquid crystal sealing material comprising (a) the radiation curable resin represented by the general formula (1) according to claim 1, (b) a photopolymerization initiator and (c) an inorganic filler having an average particle size of 3 μm or less.

4. The liquid crystal sealing material according to claim 3, wherein the radiation curable resin (a) is represented by the general formula (2)

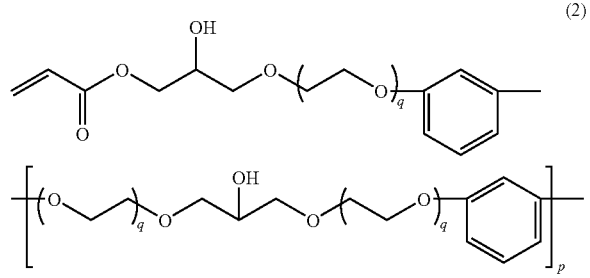

-continued

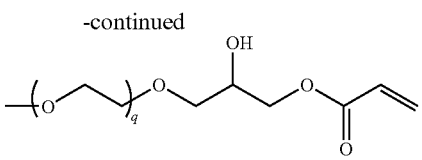

wherein a repeating unit number p represents a positive numbers ranging from 0 to 20; and a repeating unit number q represents a positive numbers ranging from 1 to 5—to clarify the claim dependency.

5. The liquid crystal sealing material according to claim 3 or 4, wherein a content of the radiation curable resin (a) is from 30% by weight to 80% by weight based on the total liquid crystal sealing material.

6. The liquid crystal sealing material according to claim 3 or 4, wherein the radiation curable resin (a) has a viscosity of from 30 to 500 Pa·s.

7. The liquid crystal sealing material according to claim 3 or 4, wherein the photopolymerization initiator (b) is a radical photopolymerization initiator.

8. The liquid crystal sealing material according to claim 7, wherein the radical photopolymerization initiator is obtainable by reacting a (meth)acrylate monomer having an isocyanate group represented by the general formula (3):

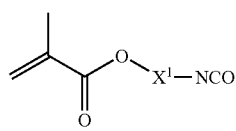

wherein $X^1$ represents a linear, branched or cyclic lower alkylene group or aryl group having 1 to 10 carbon atoms with an aryloyl compound having a hydroxyl group represented by the general formula (4):

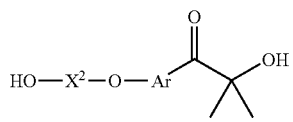

wherein $X^2$ represents a linear, branched or cyclic lower alkylene group or arylene group having 1 to 10 carbon atoms, and Ar represents an arylene group.

9. The liquid crystal sealing material according to claim 7, wherein the radical photopolymerization initiator is a carbazole initiator.

10. The liquid crystal sealing material according to claim 3 or 4, further comprising (d) an epoxy resin and (e) a heat-curing agent.

11. The liquid crystal sealing material according to claim 10, wherein the epoxy resin (d) does not elute into a liquid crystal in an amount of 0.5% or more by weight based on the liquid crystal, when said epoxy resin is directly brought into contact with the liquid crystal whose amount is ten times of that of the epoxy resin, and is allowed to stand at 120° C. for 1 hour.

12. The liquid crystal sealing material according to claim 10, wherein the heat-curing agent (e) is a dihydrazide.

13. The liquid crystal sealing material according to claim 12, wherein the dihydrazide is adipoyl dihydrazide and/or isophthalate dihydrazide and/or a dihydrazide having a valine hydantoin skeleton.

14. The liquid crystal sealing material according to claim 10, wherein the heat-curing agent (e) is a polyhydric phenol.

15. The liquid crystal sealing material according to claim 3 or 4, further comprising (f) a silane coupling agent.

16. The liquid crystal sealing material according to claim 15, wherein the silane coupling agent (f) has an amino group.

17. A liquid crystal display cell sealed with a cured product obtainable by curing the liquid crystal sealing material according to claim 3.

18. A process for manufacturing a liquid crystal display cell characterized by comprising adding a liquid crystal dropwise to the inside of a wall of the liquid crystal sealing material according to claim 3 formed on one substrate, followed by laminating the other substrate thereon.

* * * * *